March 10, 1970     H. U. BRUECKNER     3,499,707
PHOTOGRAPHIC PROJECTION APPARATUS Filed Aug. 21, 1967     2 Sheets-Sheet 1

INVENTOR.
HUBERT U. BRUECKNER
BY
Carpenter Kinney & Coulter
ATTORNEYS

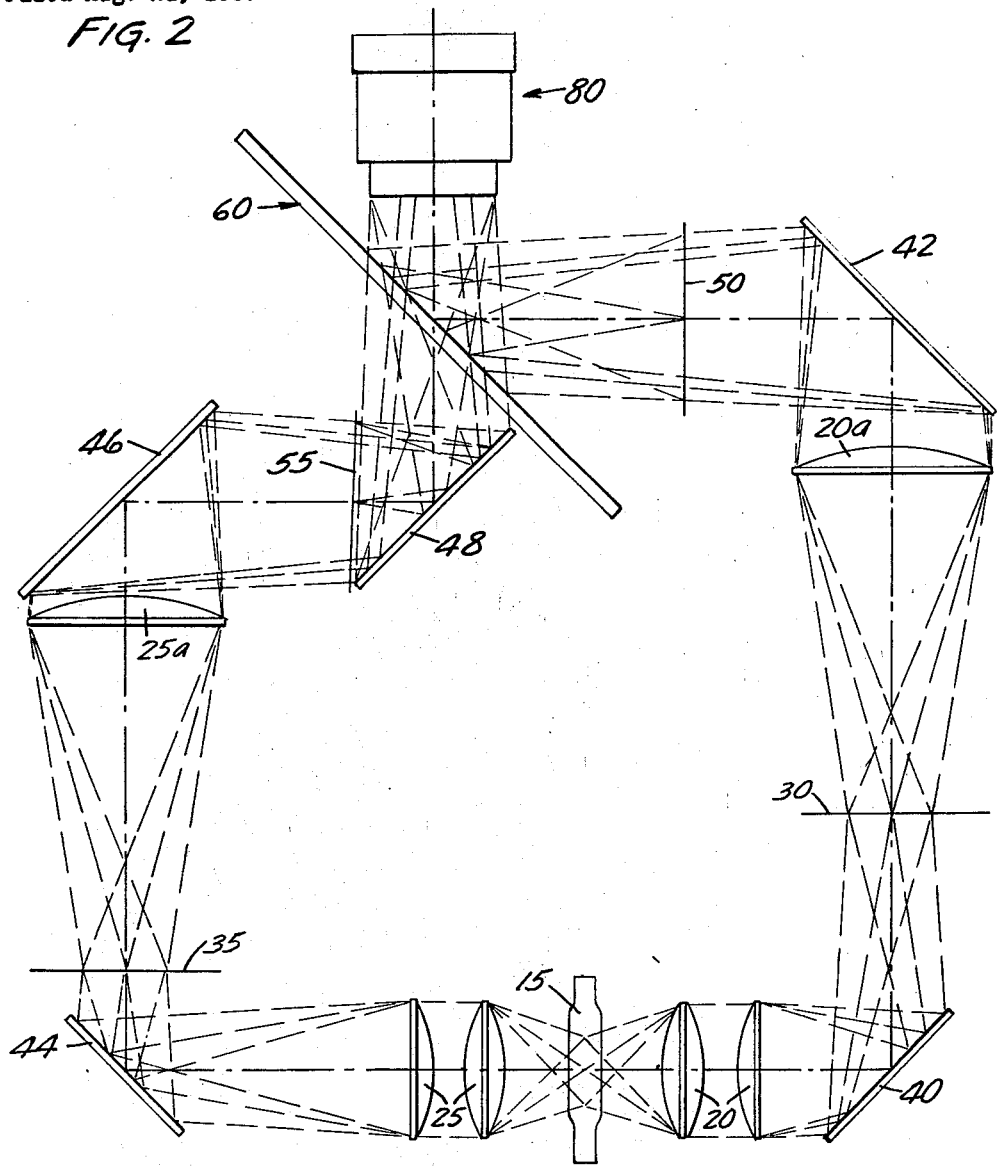

3,499,707
Patented Mar. 10, 1970

3,499,707
PHOTOGRAPHIC PROJECTION APPARATUS
Hubert U. Brueckner, White Bear Lake, Minn., assignor to Minnesota Mining and Manufacturing Company, St. Paul, Minn., a corporation of Delaware
Filed Aug. 21, 1967, Ser. No. 661,982
Int. Cl. G03b 21/14
U.S. Cl. 353—90                      5 Claims

ABSTRACT OF THE DISCLOSURE

A slide projector of compact design utilizing a single light source and a single projection lens which lap dissolves one slide or scene into another. The lap dissolve is accomplished through the use of coupled irises and a multi-bladed mirror-shutter rotating at a speed beyond the critical flicker frequency which permits the projection of one scene through the spaces between the blades and a second scene off the mirrored blades of the shutter.

---

The present invention relates to photographic projectors and more particularly relates to a lap dissolve slide projector.

With the advent of the miniature or 35 mm. camera, positive projection transparencies and associated projection equipment have assumed an increasingly important role in the photographic industry. One need only leaf through a photographic magazine or visit a photographic supply shop to appreciate the magnitude of the positive projection transparency or slide industry—there are literally hundreds of different projectors for projecting these slides onto a viewing screen. It has long been known that the projection of a succession of slides in a typical slide projector, i.e., one which utilizes a shutter to darken the screen after a slide has been projected and then keeps the screen dark until the next slide is in place and the shutter opens to project said second slide, is very tiring to a viewer due to the alternating periods of light and dark occasioned by the slide changing sequence.

In order to alleviate or, at least, minimize the eye fatique associated with the alternating periods of light and dark, slide projectors have been devised which effect a "wipe" of the projected image, i.e., one scene is seemingly rolled up to expose a second scene on the projection screen. One recent example of a slide projector which accomplishes such a wipe is shown in U.S. Patent No. 3,218,920 (Nov. 23, 1965). It should be noted that the transition between scenes in such a projector is quite abrupt because of the distinct line type transition, i.e., a distinct line appears to move across the screen, leaving a new scene to be viewed as the line moves across the screen.

Others have attempted to overcome the eye fatigue problem as well as the abrupt transition between scenes occasioned with wipe type projectors by devising slide projectors which accomplished a lap dissolve between scenes, i.e., one scene gradually fades out while another scene begins to appear and finally blossoms into view, i.e., increases in intensity, at the same rate at which the first scene fades away. Both scenes appear over the entire area of the screen superimposed upon one another during the lap dissolve cycle. These known lap dissolve projectors have necessarily involved the use of a plurality of light sources or projection lenses or both. In the latter situation the projector is, in reality, two separate slide projectors fabricated into a large unitary housing together with associated electrical equipment to coordinate the two light sources and to effect a lap dissolve of one scene into another. Some examples of known lap dissolve projectors are shown in U.S. Patent Nos. 941,752 (Nov. 30, 1909), 1,060,128 (Apr. 29, 1913) and 1,946,139 (Feb. 6, 1934). Since such lap dissolve projectors tended to be extremely intricate, bulky and expensive machines, they have not enjoyed any real measure of acceptance by the serious photographer, professional or amateur. As a result, formal, professional slide presentations are nearly always made with modified equipment which comprises two conventional slide projectors in conjunction with a suitable electrical control means that inversely increases and decreases the intensity of illumination of the projection lamps in each of the slide projectors to achieve a lap dissolve of one slide into another. In fact, a large manufacturer of slide projectors, recognizing the desirability of lap dissolve projectors has recently introduced a commercial model lap dissolve slide projector system comprising two electronically coupled conventional slide projectors. Another serious disadvantage of any dual projector system is the difficulty in obtaining proper registration of the projected images and the necessity for adjusting the relative projection paths of the two lens systems depending on the distance between the projectors and the projection screen.

It is, therefore, highly desirable to provide a slide projector of compact design which utilizes a single light source and a single projection lens and which is capable of projecting bright vivid pictures on a viewing screen.

Accordingly, an object of the present invention is to provide a relatively compact lap dissolve projector which does not have problems of image registration.

Another object of the present invention is to provide a lap dissolve projector utilizing a single light source.

Still another object of the invention is the provision of a lap dissolve projector utilizing a single projection lens.

Yet another object of the instant invention is the provision of a novel rotating shutter which makes it possible to achieve lap dissolve projection with a single projection lens.

These and other objects and advantages will become readily apparent to those skilled in the art from the following detailed description and disclosure, especially in light of the accompanying drawings, wherein like numerals refer to corresponding parts in the several diagrammatic views, and in which:

FIGURE 2 is a diagrammatic representation of the light paths through the projector of the present invention;

FIGURE 3 is an elevational view of the mirror-shutter of the projector; and

FIGURE 4 is schematic representation showing the relationship between the actual picture area to be projected and the transmitted or reflected picture area at the rotational plane of the mirror-shutter.

Figure 1:
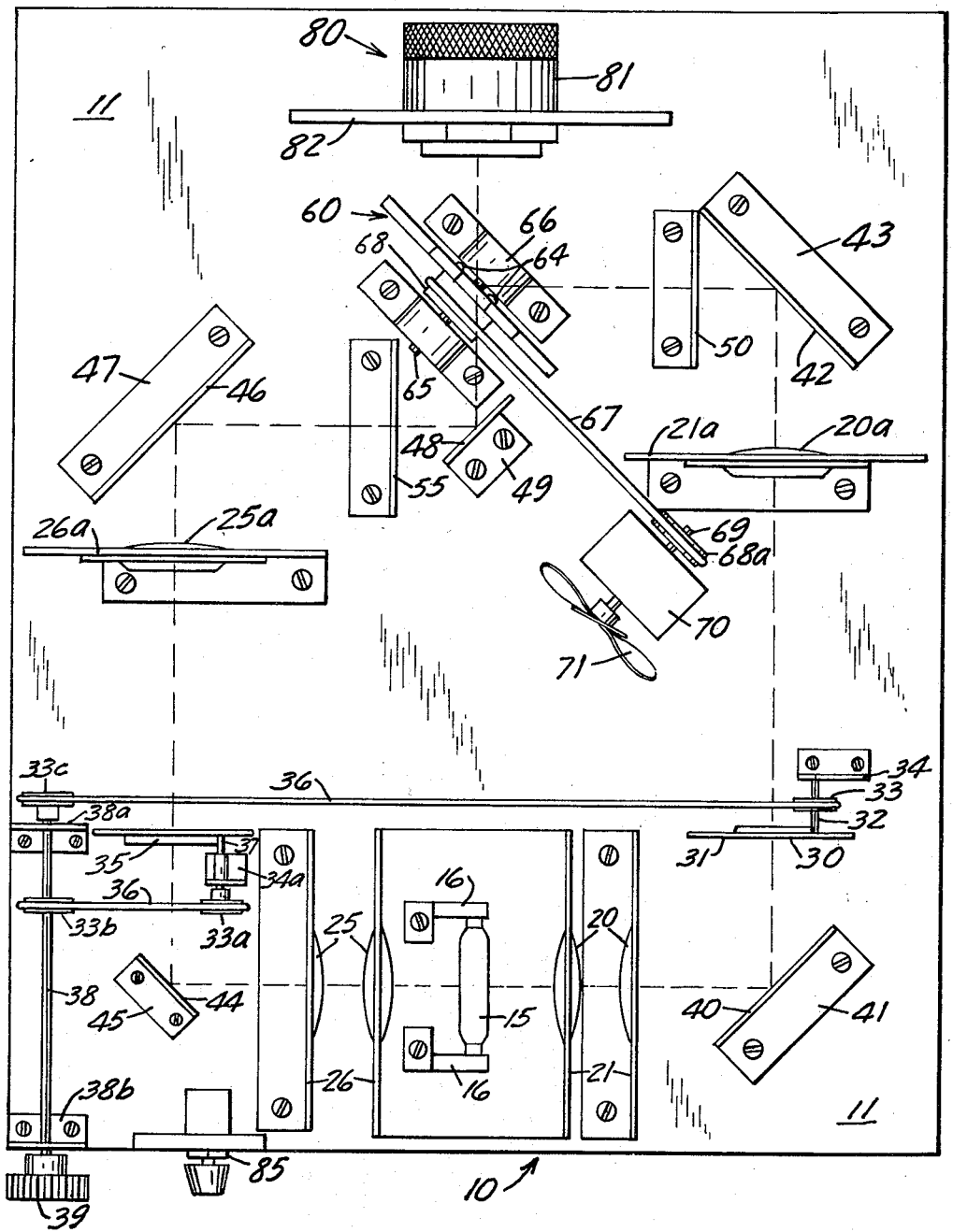
FIGURE 1 is a plan view of the projector of the present invention.

Referring now to the drawings, the illustrated projector 10 comprises base 11; a single light source 15; two sets of condensing lenses 20, 25; a pair of coupled irises 30, 35; reflecting mirrors 40, 42, 44, 46 and 48; a pair of slide holders 50, 55; mirror-shutter 60; and projection lens 80. The housing has been removed and is not shown.

In the illustrated embodiment, light source 15 is a 400 watt quartz-iodide lamp horizontally mounted in a conventional socket assembly 16. While a quartz-iodide lamp is shown and is one preferred light source because of its high light intensity and relatively low heat output, it is understood that conventional projection lamps may alternatively be utilized. It has been found that a cooling blower is not required when a quartz-iodide lamp is used as the light source. The high intensity light-emission from light source 15 is directed toward the condensing lens systems 20 and 25.

Condensing lens systems 20 and 25 are of conventional design and are optically matched so as to form a real image of the lamp filament in the plane of the coupled irises 30 and 35. It is imperative that irises 30 and 35 be located in this plane since locating the irises on either side of this plane will result in the projection of a shadow of the iris onto the projection screen. Condensing lens systems 20 and 25 can be of glass or plastic and are suitably supported by lens mounts 21 and 26, respectively, which are in turn affixed to base 11.

Light passing through condensing lens system 20 is reflected off a first surface mirror 40 and thence converges to form a real image of the lamp filament in the plane of iris 30. First surface mirror 40 is angularly disposed to condensing lens system 20 and is held in position by a suitable holder 41 affixed to base 11.

Iris 30 is a conventional leaf design iris which has been modified so that it can be completely closed and is suitably mounted on base 11 by frame 31. Iris 30 is coupled to iris 35 in such a manner that when iris 30 is fully open iris 35 is fully closed—this coupling is accomplished by a belt and pulley arrangement, as seen in FIGURE 1. The leaves of iris 30 are rotated to their open and closed positions by planetary gears (not shown), the driving gear being positioned on shaft 32 which carries pulley 33 thereon. Shaft 32 is suitably journalled into support member 34 mounted on base 11. The actual operation of irises 30 and 35 will be described in more detail as the description proceeds.

Light passing through iris 30 is collected by condensing lens 20a which is supported on housing 11 by lens mount 21a and is then reflected by first surface mirror 42. Mirror 42, as are all of the first surface mirrors 44, 46 and 48, is held in position above base 11 by a holder 43 suitably fastened to the housing base. This reflected light then passes through a slide (not shown) contained within slide holder 50 as in any conventional slide projector. The resulting light image is then reflected by the first surface mirrored shutter blades 61, 62 and 63 (shown in FIGURE 3) of mirror-shutter 60 to and through projection lens 80 and onto a viewing screen (not shown).

It will be seen that light passing through condensing lens system 25 will be reflected by first surface mirror 44 and converge at the plane of iris 35. Iris 35 is identical with iris 30 and is also opened and closed by planetary gears (not shown) driven by belt 36 riding on pulleys 33. Pulley 33a is secured to shaft 37, which is journalled into support member 34a. As will be clearly seen in FIGURE 1, pulleys 33b and 33c are coaxially affixed to shaft 38, which shaft is journalled into support members 38a and 38b, respectively, and terminates in a stub shaft to which rotatable iris control knob 39 is secured. The light which passes through iris 35 is collected by condensing lens 25a, reflected by first surface mirror 46 and passed through a second slide (not shown) carried by slide holder 55. The resulting light image is then reflected by first surface mirror 48 and passes through the apertures between the mirrored blades 61, 62 and 63 (see FIGURE 3) of mirror-shutter 60 and through projection lens 80 onto the viewing screen (not shown). As a result, during the lap dissolve cycle, as the mirror-shutter rotates, the two light images will be alternately projected in rapid sequence, the alternation rate depending on the speed of shutter rotation and the number of mirrored blades and light transmitting apertures in the shutter.

The mirror-shutter of this invention is a rotatable, shutter having a plurality of (preferably at least three) radially disposed, planar opaque areas separated by light transmitting areas, each of said opaque areas having a mirrored surface. The mirrored surfaces must have a minimum reflectivity of at least 90% and a flatness within one fringe over a one-inch diameter, preferably one-quarter fringe over a two-inch diameter. In the embodiment shown in FIGURE 3 mirror-shutter 60 comprises a circular planar disc divided into six sectors, three opaque light reflecting sectors 61, 62 and 63 being separated by three light transmitting sectors. As shown, the light transmitting sectors are apertures or openings in the shutter separating opaque, light reflecting sectors, resulting in a three-bladed shutter construction. In place of apertures or openings it is possible to use light transmitting materials, such as plastic or glass. For example, alternate sectors of a circular disc of glass may be given a mirror or light reflecting finish to provide a suitable mirror-shutter. Furthermore, the light transmitting areas of the mirror-shutter need not constitute an entire sector but may be only a portion thereof, as would be provided by a truncated sector or by a generally rectangular light transmitting area positioned radially outward from the axis of rotation of an otherwise opaque, mirrored disc. Although the mirror-shutter therefore can be variously designed, it is important that the alternating light transmitting areas and light reflecting areas of the shutter exclude and be equidistant from the axis of rotation. Preferably, the light reflecting and light transmissive areas are of similar size and are located essentially adjacent one another, i.e., as nearly adjacent as the geometry of the area permits, although the actual area size will depend on the size of the two light images at the plane of the shutter. The mirrored segments of the shutter, as previously described, serve to reflect the light image formed by the transparency in slide holder 50 to the projection lens 80, whereas the removed segments of the shutter permit the light image formed by the transparency in slide holder 55 and reflected by mirror 48 to pass through the shutter to the projection lens 80.

Mirror-shutter 60 is suitably secured as by screws 64 passed through apertures 64a to a bearing plate and pulley 68 which is journalled on shaft 65. Pulley 68 is driven by a belt 67 carried by pulley 68a affixed to one end of double ended shaft 69 of a conventional electric motor 70. Fan 71 is attached to the other end of shaft 69 and serves to cool motor 70.

Projection lens 80 comprises a cylindrical metal or plastic lens barrel 81 containing conventional optical glass or plastic projection lenses and a metal or plastic lens mount 82. The lens mount 82 of projection lens 80 in the illustrated embodiment is suitably mounted onto base 11 although it is obvious that it may be fastened to the front wall of the housing (not shown).

Projection lamp 15 and motor 70 are wired in series and are controlled by a fused toggle switch 85 connected to an electrical current source (not shown).

In operation, a positive transparency slide is positioned in slide holder 50 for projection through projection lens 80 onto a viewing screen (not shown). Of course, it is understood that the projector has been connected to a suitable current source, toggle switch 85 has been turned "on" and iris control knob 39 has been rotated to open iris 30. Motor 70 is designed to rotate the mirror-shutter at a rate of speed which is beyond the critical flicker frequency of the human eye, i.e., about 1350 r.p.m. The axis of rotation of mirror-shutter 60 must be normal to the plane in which all the mirrored surfaces of blades 61, 62 and 63 lie and the rotational plane must also be within one fringe over a one-inch diameter and preferably one-quarter fringe over a two-inch diameter.

It is well known that the ability or inability of the eye to detect or "see" flicker is a very subtle psychological phenomenon and results from the fact that the eye does not respond immediately to a stimulus; when the stimulus is removed it similarly does not react immediately. This is to say that we do not "see" an image immediately and we continue to "see" it after it has disappeared. The latter phenomenon, the so-called "retention of vision," is utilized in eliminating flicker since it fills in the "dark periods." Thus, if one image is removed and a second image is projected during this period of retention, the eye cannot detect that any interruption in projection has occurred. In the instant case, flicker could be caused by the rotating mirror-shutter whose blades or spaces therebetween "block out" the light so that we have alternate periods of light and dark. It has been found that the slowest flicker-free speed of shutter rotation can be reached by using a multi-bladed structure having blades which are equally spaced and which are essentially equal in area to the spaces between them. Other configurations are possible but generally require higher shutter speeds to avoid detectable flicker. Not only does the multi-blade (preferably three blades) geometry enable the "mirror-shutter" to be rotated at the slowest possible speed without showing flicker (about 1350 r.p.m. or about 65 (image) cycles per second) but it also enables an equivalent amount of light to be projected between blades 61, 62 and 63 of mirror-shutter 60 as is reflected off the shutter blades, to ensure two projected pictures of equal brightness.

FIGURE 2 illustrates the light paths through projector 10 and the manner in which an image is projected onto a screen. The projected image is, of course, an enlarged projection of the image contained on the transparency in slide holder 50. Although the image is only intermittently projected onto the screen at a rate of at least about 65 cycles per second, the eye cannot detect the flicker.

Referring now to FIGURES 3 and 4, an outline of an image 90 is shown on one blade 61 of mirror-shutter 60. It will be seen from FIGURE 4 that the dimensions of image outline 90 have been somewhat altered because of the angular relationship of mirror-shutter 60 to the plane of slide holder 50. The dimensions of the image of a slide positioned in slide holder 55 would be similarly altered if "viewed" at an aperture between two blades, e.g., 61 and 62, of mirror-shutter 60, in the rotational plane of the mirror-shutter due to the corresponding angular relationship between mirror 48 and slide holder 55.

As will be obvious from FIGURE 3, the blades of mirror-shutter 60 must have an area at least as large as image outline 90 and the mirror-shutter must be aligned so that the functionally operative area of each mirrored blade 60, 61 and 62, as well as the spaces or apertures therebetween, will embrace the entire image outline 90 of the slide contained within slide holders 50 and 55.

When it is desired to project a second slide onto the screen, i.e., the slide contained within slide holder 55, iris control knob 39 is rotated in the direction to open iris 35. As previously noted, irises 30 and 35 are coupled so that opening of either iris results in the other iris being closed, the opening and closing rate being equal. Thus, as iris control knob 39 is rotated to open iris 35, it will be seen that the image of the second slide will slowly begin to appear on the screen as light is allowed to pass through iris 35 and through the second slide and through the spaces between mirrored blades 61, 62 and 63 of mirror-shutter 60 and through projection lens 80. Since iris 30 is still partially open at this time, the image of the first slide will also be projected onto the screen. At the midpoint of the lap dissolve cycle, the eye would see two fully superimposed images on the screen. As iris control knob 39 is rotated still further, the image of the first slide will gradually fade from view while the image of the second slide blossoms into full view, i.e., is intensified, thus completing one lap dissolve cycle. The entire sequence would be repeated when the next slide in slide holder 50 is projected onto the screen.

Although the lap dissolve projector of the present invention has been described as a manually operated device, it is contemplated that an automatic or semi-automatic slide transport mechanism can be devised. In such an automatic or semi-automatic device, the iris control function would also be automated. It will also be obvious to those skilled in the art that most, if not all, of the supporting members for the components of the projector can be integrally formed with base 11 of the projector.

Various other embodiments of the present invention will be apparent to those skilled in the art without departing from the scope hereof.

What is claimed is:

1. A slide projector having a single light source and a single projection means for the projection of light images from each of two slides, light directing means, means for varying the intensity of the projected image from each of said slides, a rotatable shutter having a plurality of radially disposed, opaque areas separated by light transmitting areas, each of said opaque areas having a flat mirrored surface, the light from said light source being directed to and through said means of varying the intensity of the projected image from each of said slides and to the shutter by said light directing means, said shutter being so positioned in the light path from both of said slides that the light image from one of said slides passes through the light transmitting areas of said shutter when in rotation and hence to and through said projection means and the light image from the other of said slides is reflected by the mirrored surface of the opaque areas of the shutter when in rotation and hence to and through said projection means, and means for rotating said shutter.

2. A slide projector according to claim 1 wherein the means for varying the intensity of the projected image from each of said slides comprises a pair of fully closeable irises synchronously coupled in such a manner that opening of one of said irises closes the other of said irises.

3. A slide projector according to claim 1 wherein the shutter comprises a rotatable planar disc having a plurality of alternate, radially disposed, light transmitting areas and radially disposed, planar, opaque, light reflecting areas, said light transmitting and light reflecting areas being similar in size, adjacent one another, and equidistant from and exclusive of the axis of rotation of said rotatable shutter.

4. A slide projector according to claim 3 wherein the light reflecting areas are mirrored surfaces having a minimum reflectivity of at least 90% and a flatness within one fringe over a one-inch diameter.

5. A slide projector according to claim 1 wherein the shutter comprises a circular planar disc divided into six alternate opaque light reflecting and light transmitting sectors, said light reflecting sectors having mirrored surfaces with a minimum reflectivity of at least 90% and a flatness within one fringe over a one-inch diameter, the portion of each of said light transmitting sectors exclusive of the axis of rotation of said rotatable disc being excised from said disc to form a three-bladed structure.

References Cited

UNITED STATES PATENTS

| 1,461,133 | 7/1923 | Marten | 353—82 |
| 1,946,139 | 2/1934 | Hall | 353—83 |
| 2,031,361 | 2/1936 | Bowen | 353—90 XR |
| 2,074,991 | 3/1937 | Salcedo | 353—89 XR |

NORTON ANSHER, Primary Examiner

R. P. GREINER, Assistant Examiner

U.S. Cl. X.R.

353—35, 82